United States Patent [19]
Takahashi et al.

[11] Patent Number: 5,144,344
[45] Date of Patent: Sep. 1, 1992

[54] SPECTACLES FOR STEREOSCOPIC PICTURES

[75] Inventors: Katsumasa Takahashi, Tokyo; Takuya Nakamaru, Kanagawa; Osamu Iino, Chiba, all of Japan

[73] Assignee: Sony Corporation, Tokyo, Japan

[21] Appl. No.: 527,822

[22] Filed: May 24, 1990

[30] Foreign Application Priority Data

May 25, 1989 [JP] Japan ................ 1-60529[U]
May 25, 1989 [JP] Japan ................ 1-60530[U]

[51] Int. Cl.$^5$ .................. G02C 7/10; G02B 27/22
[52] U.S. Cl. ........................... 351/44; 351/41; 359/464; 359/478
[58] Field of Search ............ 351/44, 47; 350/130, 350/131, 132, 133, 144; D16/102, 115; 359/462–466, 478

[56] References Cited

U.S. PATENT DOCUMENTS

| 104,656 | 6/1870 | St. Clair | 351/124 |
|---|---|---|---|
| D. 282,372 | 1/1986 | Blaimschein | D16/102 |
| 2,688,900 | 9/1954 | Silverman | 351/49 |
| 3,944,344 | 3/1976 | Wichers | 351/153 |
| 4,705,371 | 11/1987 | Beard . | |
| 4,836,647 | 6/1989 | Beard | 350/132 |
| 4,890,356 | 1/1990 | Czech et al. | 351/153 |

OTHER PUBLICATIONS

"Magnet" Attachments, The Optician, Jun., 1961.

Primary Examiner—Rodney B. Bovernick
Attorney, Agent, or Firm—Hill, Van Santen, Steadman & Simpson

[57] ABSTRACT

The present invention relates to a pair of spectacles for stereoscopic pictures based upon the principle of the Pulfrich effect. The direction in which a moving object is moving in a picture or the moving direction of a video camera is marked on the spectacles for stereoscopic pictures to obtain a correct stereoscopic image, so that the viewer can easily and readily determine which of a darker lens or a lighter lens is applied to which eye. According to the invention, the connecting portions between the front frame and the temples of the spectacles are formed as a pair of hinges which protrude from the inside front frame and are spaced apart from each other so that a space therebetween receives the hinges of a pair of standard glasses worn by a viewer to support the stereoscopic spectacles on the standard glasses with great stability. This also enables the stereoscopic spectacles to be reduced in size so that they may be worn more stably by those who do not wear vision correcting glasses.

13 Claims, 3 Drawing Sheets

SPECTACLES FOR STEREOSCOPIC PICTURES

BACKGROUND OF THE INVENTION

1. Field of the Invention

The present invention relates generally to a pair of viewing glasses and, more particularly, to a pair of viewing glasses for seeing a stereoscopic or three-dimensional image from a two-dimensional image.

2. Description of the Related Art

Viewing glasses for stereoscopic pictures have been used in the past in which a stereoscopic or three-dimensional image is produced by images played back by a two-dimensional image display apparatus, such as a television, motion picture or the like which is viewed through a pair of viewing glasses or spectacles.

To produce a three-dimensional image through the use of the viewing glasses for stereoscopic pictures, it has been proposed that the two lenses of the viewing glasses be polarized, with one of the lenses having a polarizing plane lying at an angle different than the polarizing plane of the other lens, or that the lenses be based on different color systems, such as one lens being a red color filter and the other lens being a blue color filter. Of course, the image being viewed must be presented in the corresponding format.

In addition, U.S. Pat. No. 4,705,371 describes a pair of viewing glasses based on the principle of the Pulfrich effect. In this reference, the viewing glasses are formed on the basis of the Pulfrich effect and have one of the eye lenses of a greater optical density than the other eye lens.

In the use of viewing glasses based on the Pulfrich effect, when an image is viewed through a pair glasses having a dark right-eye lens and a light left-eye lens, an object moving from left to right in an image is viewed as a three-dimensional image. When, on the other hand, a two-dimensional image is viewed through a pair of glasses having a dark left-eye lens and a light right-eye lens, an object moving from right to left in a two-dimensional image is viewed as a three-dimensional image. Accordingly, by utilizing the aforenoted viewer glasses for stereoscopic pictures, it is possible to view a normal two-dimensional image such as a television image, a motion picture image or the like as a stereoscopic image.

When viewer wears the aforementioned viewing glasses for viewing the stereoscopic picture based on the principle of the Pulfrich effect, the viewer must identify which dark or light lens is intended for which eye, otherwise the viewer cannot view the stereoscopic image correctly. Nevertheless, the known viewing glasses for stereoscopic pictures are inconvenient since the position, or orientation, of the glasses is not readily or easily ascertainable.

Furthermore, if the viewer requires vision correcting glasses, such as to correct nearsightedness, the viewer must wear the stereoscopic viewing glasses over the viewer's vision correcting glasses. This is not only true for stereoscopic viewing glasses based on the Pulfrich effect, but also is true for viewing glasses for stereoscopic pictures that are based on other than the Pulfrich effect, such as the polarized system or the two color system glasses as described above.

Accordingly, a pair of viewing glasses for stereoscopic pictures must be made large enough to enable a viewer wearing vision correcting glasses to also wear the stereoscopic viewing glasses. Nevertheless, when a viewer wears the stereoscopic viewing glasses over standard glasses, the stereoscopic viewing glasses are generally not stable and tend to slip down or become misaligned, which is uncomfortable and disadvantageous for the viewer.

Furthermore, for those who do not wear vision correcting glasses, such stereoscopic viewing glasses are generally too large in size to enable the viewer to wear them in a properly fitted fashion.

SUMMARY OF THE INVENTION

It is an object of the present invention to provide improved spectacles for viewing stereoscopic pictures based on the Pulfrich effect in which the aforenoted shortcomings and disadvantages in the prior art are eliminated.

More specifically, it is an object of the present invention to indicate the direction of lateral movement of a moving object within a picture or image or a direction of lateral movement of a television or video camera or the like on a pair of spectacles for stereoscopic pictures based on the Pulfrich effect.

Another object of the invention enables spectacles for stereoscopic pictures to be worn over standard vision correcting glasses comfortably and without slipping. This object is achieved by a pair of spectacles for stereoscopic pictures in which coupling portions are provided at the front frames of the spectacles and temples of the spectacles, the coupling portions protruding from inside the front of the frames and being spaced apart from one another to accept the hinges of standard vision correcting glasses therebetween. Such coupling portions are formed by a pair of hinges between each temple and the front frame in the present stereoscopic viewing spectacles.

Accordingly, with the present invention, a viewer can easily and readily identify which dark or light lens is intended to be seen by each eye and, furthermore, the spectacles for stereoscopic pictures are supported by a pair of standard vision correcting glasses so that they can be worn more stably. The present spectacles for stereoscopic pictures can also be reduced in size and therefore made more compact compared to the known stereoscopic viewing glasses.

According to a first aspect of the present invention, spectacles for stereoscopic pictures that are based on the principle of the Pulfrich effect are comprised of a pair of light filters, one of which is darker than the other, a frame supporting the pair of light filters, and a direction mark corresponding to the direction of picture movement. The direction mark is provided on the filter or on the frame to enable the wearer to easily determine the proper orientation for correctly view the image as a stereoscopic image.

In accordance with the second aspect of the invention, spectacles for stereoscopic pictures include a pair of light filters, a frame for supporting the pair of light filters, a pair of temples for engagement on or near human ears, and two pair of hinge members provided between the frame and each of the temples. Each pair of hinge members have inwardly protruding portions and a concave portion provided therebetween for receiving the temples of glasses worn by a viewer.

Theses and other objects and advantages of the invention will become apparent to those of skill in the art from the following description of the preferred embodiments taken together with the accompanying drawings.

DESCRIPTION OF THE PREFERRED EMBODIMENTS

Figure 1A:
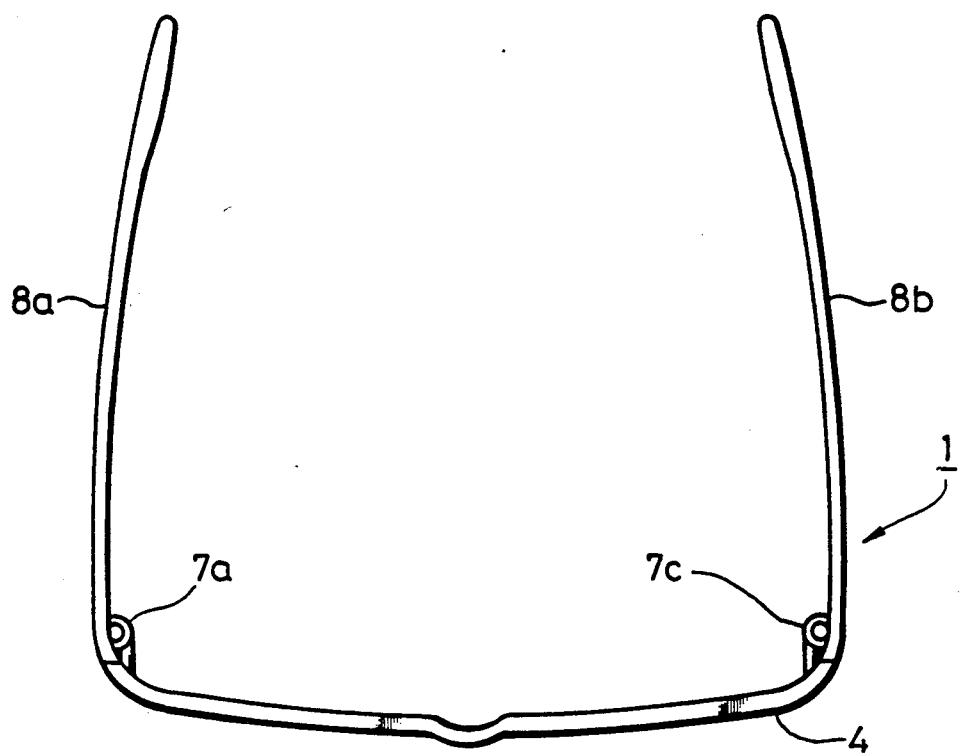
FIG. 1A is a top plan view of a first embodiment of a pair of spectacles for stereoscopic pictures according to the principles of the present invention.
Figure 1C:
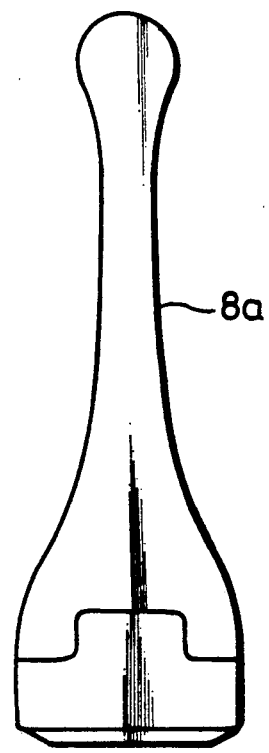
FIG. 1C is a left-side elevational view of the spectacles of FIG. 1A.
Figure 1D:
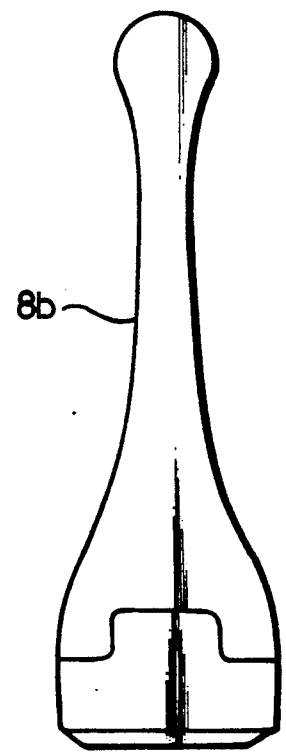
FIG. 1D is a right-side elevational view of the spectacles of FIG. 1A.
Figure 1B:
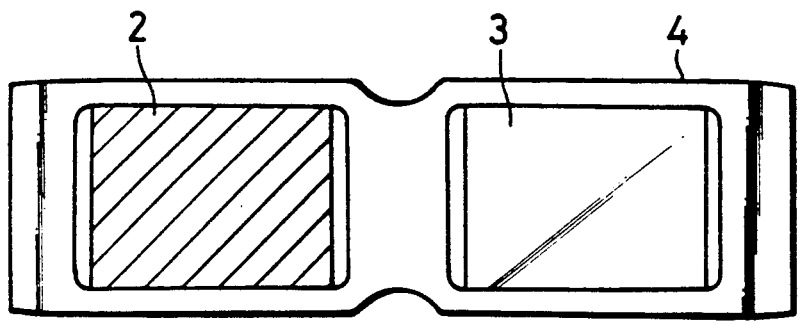
FIG. 1B is a front elevational view of the spectacles of FIG. 1A.
Figure 1E:
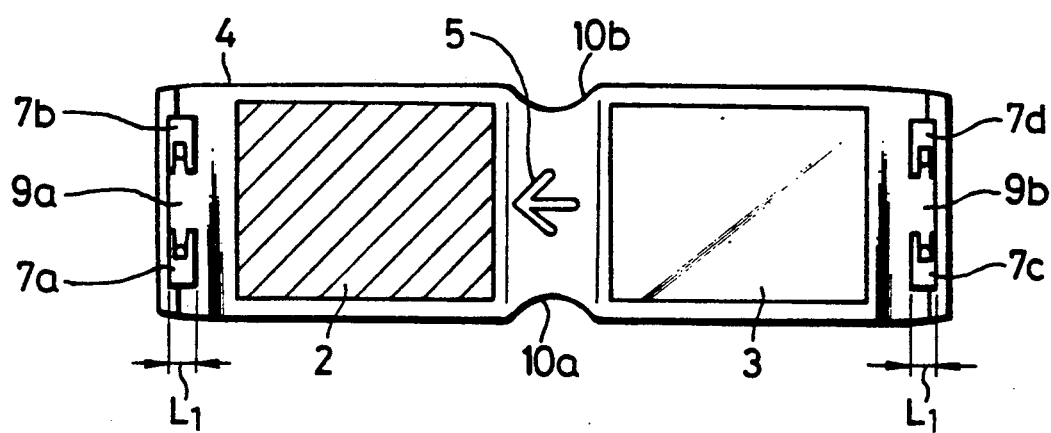
FIG. 1E is a rear elevational view of the spectacles of FIG. 1A, and illustrating a main portion of the frame.

FIGS. 1A through 1E illustrate a first embodiment of a pair of spectacles for stereoscopic pictures according to the invention, wherein FIG. 1A is a top view, FIG. 1B is a front view, FIGS. 1C and 1D are side views, and FIG. 1E is a rear view illustrating the inside of the front frame of the spectacles opposing the viewers eyes.

Referring to FIGS. 1A through 1E, a pair of spectacles 1 of the preferred embodiment are composed of a front frame 4, a lens 2 having a high optical density, a lens 3 having a low optical density, and a pair of temples 8a and 8b for positioning on either side of the head of the viewer. As shown in FIG. 1E, the front frame 4 has a concave portion 10a formed thereon. This concave portion 10a has a suitable shape to accept the wearer's nose when the spectacles are worn by the wearer. A second concave portion 10b is formed in the front frame 4 which is the same concave portion 10a, and the concave portions 10a and 10b are symmetrical relative to each other. In other words, the spectacles 1 are symmetrical about the top and bottom and the right and left so that the wearer may correctly wear the spectacles both right side up and upside down.

As shown in FIG. 1E, a direction mark 5 is provided on the front frame 4 in a position between the lenses 2 and 3 and on a side of the frame opposite the wearer's eyes. The direction mark 5 indicates a direction in which an object is moving within a picture so that the viewer can correctly view the stereoscopic image through the spectacles 1 using the Pulfrich effect. In other words, the direction arrow 5 shows the direction from the low density optical lens 3 to the high density optical lens 2.

The temple 8a is supported on the front frame 4 by hinges 7a and 7b so that it can be freely rotated about the hinges, and the temple 8b is supported on the front frame 4 by hinges 7c and 7d so that is also can be freely rotated thereabout. The hinges 7a and 7b protrude from the front frame 4 at the surface facing the viewer's eyes. The hinges 7a and 7b are separated from each other by a predetermined spacing in a vertical direction so that a concave portion 9a is formed between the hinges 7a and 7b. The hinges 7c and 7d are formed in the same manner as the hinges 7a and 7b so that a concave portion 90 is formed therebetween.

Figure 2:
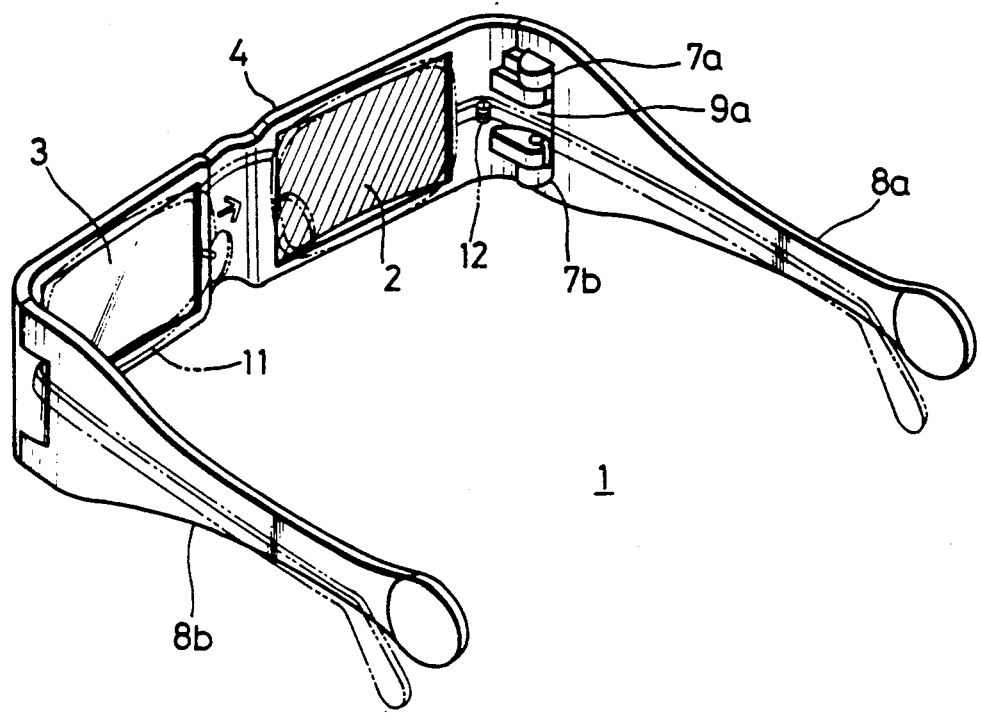
FIG. 2 is a perspective view of the first embodiment of the spectacles for stereoscopic pictures according to the invention.

When a viewer, wearing a pair of standard vision correcting glasses, such as a pair of glasses for correcting nearsightedness wears the spectacles 1 for a stereoscopic picture over the vision correcting glasses, the hinges of the vision correcting glasses are received in the concave portion 9a and 9b, respectively, so that the spectacles 1 for stereoscopic pictures are supported in a stable fashion by the hinges of the vision correcting glasses. More specifically as shown in FIG. 2, when the viewer wears a pair of standard glasses 11 and wears the spectacles 1 for the stereoscopic pictures, a hinge 12 of the standard glasses 11 is received by the concave potion 9a formed between the pair of hinges 7a and 7b of the spectacles 1, and the hinge 12 comes into contact with a lower portion of the hinge 7 of the spectacles 1, thereby providing stable support for the spectacles 1.

Since the hinge 12 of the standard glasses 11 is received by the hinges 7a and 7b of the spectacles 1, as shown in FIG. 1E, the size of the spectacles 1 in the lateral direction may be reduced by a width $L_1$ of each of the hinges 7a and 7b in a lateral direction. According to one sample of the spectacles 1, the size of the spectacles may be reduced in a lateral direction by approximately 10 mm as compared to the known spectacles for stereoscopic pictures.

The above-described hinge structure for the present spectacles based on the principle of the Pulfrich effect is not limited to spectacles for this effect and may be applied to other spectacles such as spectacles for other stereoscopic picture systems.

The spectacles 1 for stereoscopic pictures of the present invention shown in FIGS. 1A through 1E and 2 will be described more fully below. When a viewer wears the spectacles 1 for viewing a stereoscopic picture, if an object moves from left to right within a picture to be viewed, the viewer can easily confirm the direction shown by the direction mark before wearing the spectacles 1. In the case of the spectacles shown in FIG. 2, the direction mark 5 indicates the direction from left to right and this direction is indicated by the direction mark 5 which coincides with the direction in which the object is being moved. This enables the wearer of the spectacles to correctly determine which of the lenses is the darker or high density optical lens 2 for the right eye and which is the lighter or low density optical lens for the left eye.

If, on the other hand, the object in the image moves from right to left in the picture, the direction mark 5 in FIG. 2 lets the viewer know the reverse direction so that the viewer can rotate the spectacles 1 by 180° and wear the spectacles with the direction mark 5 indicating the direction from right to left. In this way, the viewer can correctly wear the spectacles in such fashion that the darker lens fits the left eye and the lighter lens fits the right eye.

The present spectacles may be used for viewing a television image or a motion picture image to provide a three-dimensional effect. The spectacles are also ideal for use with video games, where movement frequently more limited in direction than with ordinary television and movie images.

Figure 3:
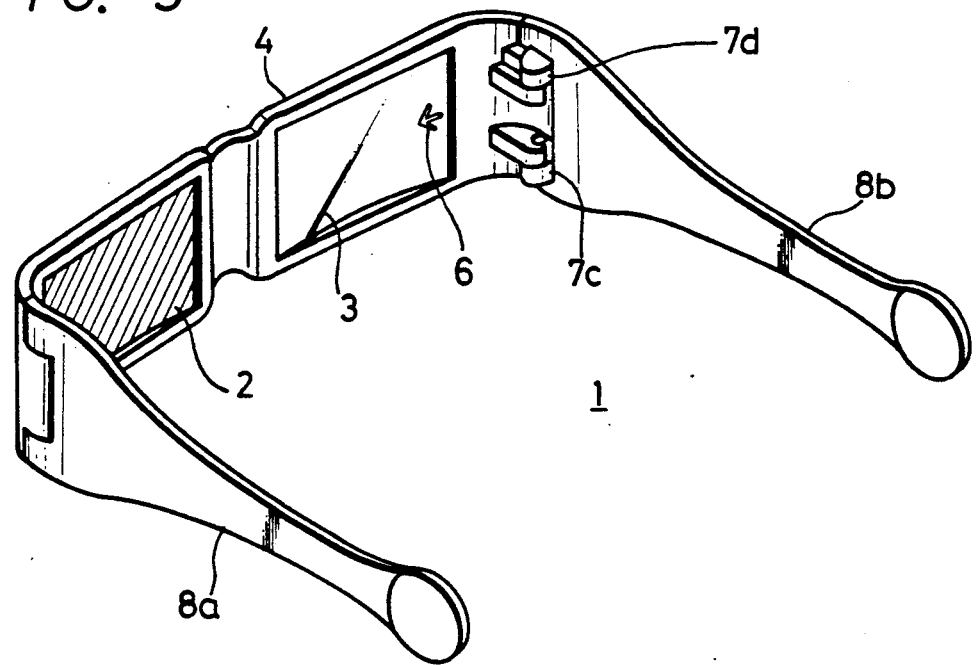
FIG. 3 is a perspective view of a second embodiment of spectacles for stereoscopic pictures according to the present invention.

FIG. 3 shows a perspective view of a second embodiment of the spectacles for stereoscopic pictures according to the present invention. In FIG. 3, like parts corresponding to the parts of FIGS. 1 and 2 are marked with the same reference characters and therefore are not described in detail hereinbelow.

The second embodiment of FIG. 3 is different from the first embodiment as shown in FIGS. 1A through 1E and 2 in that a direction mark, which shows the moving direction of the object, and is designated by reference numeral 6 in FIG. 3, is provided on an end portion of the lighter lens 3 but is not provided on the front frame 4 at the position between the lenses 2 and 3.

According to the second embodiment shown in FIG. 3, the viewer can wear the spectacles 1 and easily and correctly determine the direction of movement as with the first embodiment. In the second embodiment, the display position of the direction mark 6 is not limited to the lens 3 and the direction mark 6 may be provided on either the lenses 2 or 3 or on both of the lenses 2 and 3. Further, the direction mark 6 may be formed on the lens 2 and/or 3 at the side opposing the viewers eyes or on the opposite side. Furthermore, the direction mark 6 may be provided on the lens by some suitable means such as printing, applying a sticker, or forming the direction mark 6 by a molding process during molding of the frame. In addition, the direction marks 5 and 6 may be provided on the front frame 4, on the lenses 2 or 3, or by printing or may be replaced by a direction mark or a sticker or the like.

By taking a picture of a still object using a moving video camera, it is possible to make a picture in which a still object is being moved within the picture image. Accordingly, a direction mark indicating the moving direction of the video camera and displayed on the spectacles may be provided. In that case, it is desired that the direction mark be fully explained in the explanatory notes or the like because the direction indicated by the direction mark is reversed relative to the moving direction of the object in the picture.

While the direction mark indicates the moving direction of the object or the moving direction of the video camera in the above-described embodiments, the direction mark is not limited thereto and other direction marks may be provided so long as they indicate a moving direction.

As described above, and in accordance with the present invention, the spectacles for stereoscopic pictures are based on the principle of the Pulfrich effect. The direction in which the moving object is moved in the picture or the moving direction of the video camera is marked on the spectacles for stereoscopic pictures in order to obtain a correct stereoscopic picture so that the viewer can easily and readily determine which of the darker lens or the lighter lens should be applied to which eye.

Further, according to the present invention, the connecting portions of the front frame 4 and the temples 8a and 8b in the spectacles 1 for stereoscopic pictures are formed as a pair of hinges which protrude from the front frame 4 at the surface opposing the viewers eyes and are spaced apart from each other. The hinges for standard glasses are received between the two hinges so that when the viewer is wearing standard glasses, the spectacles for stereoscopic pictures are supported by the standard glasses with great stability. Also, the spectacles for stereoscopic pictures may be reduced in size as a result of the hinge structure, in which case the spectacles for stereoscopic pictures may be worn stably by those who do not wear standard glasses.

Although other modifications and changes may be suggested by those skilled in the art, it is the intention of the inventor to embody within the patent warranted hereon all changes and modifications as reasonably and properly come within the scope of their contribution to the art.

We claim:

1. Spectacles for viewing of stereoscopic images based upon the principle of the Pulfrich effect, comprising:
   first and second light filtering lenses, said first light filtering lens being optically less dense relative to said second light filtering lens;
   a frame supporting said first and second light filtering lenses, wherein said frame comprises:
      a front frame portion supporting said first and second light filtering lenses, said front frame portion being symmetrical in a right and left direction and an up and down direction so that said spectacles may be worn with said first light filtering lens over the right eye of the wearer or inverted so that said first light filtering lens is worn over the left eye; and
      a pair of temple pieces mounted on each of two sides of said front frame portion, said temple pieces being symmetrical in an up and down direction so that each temple piece may be supported on either ear of the wearer; and
   a direction mark applied to at least one of said frame and said first and second light filtering lenses, said direction mark being indicative of a direction of picture movement for viewing a picture through said first and second light filtering lenses as a stereoscopic image using the Pulfrich effect.

2. Spectacles as claimed in claim 1, wherein said direction mark is applied on said frame at a location between said first and second light filtering lenses.

3. Spectacles as claimed in claim 1, further comprising:
   first and second hinges pivotably mounting each one of said pair of temple pieces to said front frame portion so that said temple pieces are pivotable about corresponding pivot axes, said first and second hinges for each of said temples being spaced apart from one another along corresponding ones of said pivot axes to define a space between said first and second hinges at each of said temple pieces within which hinge regions of vision correcting spectacles and the like are disposable so that said spectacles for viewing stereoscopic images are held in place on said vision correcting spectacles.

4. Spectacles for viewing stereoscopic pictures based on the Pulrich effect comprising:
   a pair of light filters for stereoscopic viewing of a two dimensional image as a apparent three dimensional image;
   a frame supporting said pair of light filters;
   a pair of temples adapted for engagement adjacent human ears; and
   two pairs of hinges connecting each of said temples to said frame, each pair of said hinges connecting one side of said frame to one of said temples, said hinges each having an inwardly projecting portion spaced in a vertical direction from a corresponding inwardly projecting portion of another of said hinges of said pair to define a concave portion between said inwardly projecting portions, said concave portion being a coupling space adapted to receive temples of vision correcting glasses when both vision correcting glasses and the spectacles for stereoscopic viewing are worn by an individual;
   wherein one of said pair of light filters is optically denser that another of said light filters;
   wherein said frame and said pair of temples are substantially symmetrical about a center portion between said pair of light filters so that said spectacles may be inverted and worn with the optically denser lens over either eye.

5. Spectacles as claimed in claim 4, wherein said pair of temples are symmetrical in a right and left direction and an up and down direction.

6. Spectacles as claimed in claim 5, further comprising:
a direction indicating mark on an inner portion of said frame, said direction indicating mark being indicative of a movement direction for viewing images using a Pulfrich effect.

7. Spectacles as claimed in claim 6, wherein said direction indicating mark is between said pair of light filters on said frame.

8. Spectacles as claimed in claim 7, wherein said direction indicating mark is an arrow directed from a lighter one of said light filters to a darker one of said light filters.

9. Spectacles as claimed in claim 5, further comprising:
a direction indicating mark on one of said lenses, said direction indicating mark being indicative of a movement direction for viewing images using a Pulfrich effect.

10. Spectacles as claimed in claim 5, further comprising:
a direction indicating mark on said frame, said direction indicating mark being indicative of a movement direction for viewing images using a Pulfrich effect.

11. Spectacles for viewing of stereoscopic images based upon the principle of the Pulfrich effect, comprising:
first and second light filtering lenses, said first light filtering lens being optically less dense relative to said second light filtering lens;
a frame supporting said first and second light filtering lenses, said frame being symmetrical in an up and down direction and in a left and right direction so that said frame may be worn with the less dense lens over either eye;
a direction mark applied to at least one of said frame and said first and second light filtering lenses, said direction mark being indicative of a direction of picture movement for viewing a picture through said first and second light filtering lenses as a stereoscopic image using the Pulfrich effect; and
means for coupling said frame to vision correcting spectacles.

12. Spectacles as claimed in claim 11, wherein said means for coupling comprises a pair of vertically spaced projections extending inwardly for engaging vision correcting spectacles when said spectacles for stereoscopic viewing are worn over said vision correcting spectacles.

13. Spectacles as claimed in claim 12, wherein said projections are hinges pivotally mounting said temple pieces to said frame.

* * * * *